(12) United States Patent
Murayama et al.

(10) Patent No.: US 11,345,388 B2
(45) Date of Patent: May 31, 2022

(54) VEHICLE STEERING APPARATUS

(71) Applicant: HONDA MOTOR CO., LTD., Tokyo (JP)

(72) Inventors: Hisashi Murayama, Wako (JP); Shintaro Masu, Wako (JP); Yuki Aoki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 19 days.

(21) Appl. No.: 16/807,846

(22) Filed: Mar. 3, 2020

(65) Prior Publication Data

US 2020/0283054 A1  Sep. 10, 2020

(30) Foreign Application Priority Data

Mar. 4, 2019 (JP) .............................. JP2019-038171

(51) Int. Cl.
| | |
|---|---|
| *B62D 1/183* | (2006.01) |
| *B60N 2/64* | (2006.01) |
| *B62D 1/10* | (2006.01) |
| *B62D 6/00* | (2006.01) |
| *B62D 1/181* | (2006.01) |
| *B60N 3/00* | (2006.01) |
| *B62D 1/02* | (2006.01) |

(52) U.S. Cl.
CPC .............. *B62D 1/183* (2013.01); *B60N 2/64* (2013.01); *B62D 1/10* (2013.01); *B62D 6/00* (2013.01)

(58) Field of Classification Search
CPC ... B62D 1/02; B62D 1/10; B62D 1/18; B62D 1/181; B62D 1/183; B62D 6/00; B60N 2/64; B60N 3/001; B60K 2370/733; B60K 2370/736; B60K 2370/739

See application file for complete search history.

(56) References Cited

U.S. PATENT DOCUMENTS

| | | | |
|---|---|---|---|
| 9,834,121 B2 | 12/2017 | Riefe | |
| 10,065,655 B2 | 9/2018 | Bendewald et al. | |
| 10,577,012 B2 | 3/2020 | Dekker et al. | |
| 10,583,740 B2 * | 3/2020 | Ory | B60K 37/06 |
| 2005/0283288 A1 * | 12/2005 | Howell | B62D 1/18 |
| | | | 701/41 |

(Continued)

FOREIGN PATENT DOCUMENTS

| | | |
|---|---|---|
| CN | 105683021 A | 6/2016 |
| CN | 106608212 A | 5/2017 |

(Continued)

OTHER PUBLICATIONS

Description Translation for DE 10259684 from Espacenet (Year: 2004).*

(Continued)

*Primary Examiner* — James A English
*Assistant Examiner* — Daniel M. Keck
(74) *Attorney, Agent, or Firm* — Carrier Blackman & Associates, P.C.; Joseph P. Carrier; Jeffrey T. Gedeon

(57) ABSTRACT

A vehicle steering apparatus includes a steering wheel that is mechanically separable from a steering mechanism of a vehicle, and a lateral movement mechanism that moves the steering wheel between a manipulation position set in front of a driver's seat and a withdrawn position set to a position located between the manipulation position and a position in front of a passenger seat.

8 Claims, 13 Drawing Sheets

(56) References Cited

U.S. PATENT DOCUMENTS

| | | | |
|---|---|---|---|
| 2016/0244070 A1* | 8/2016 | Bendewald | B62D 1/185 |
| 2018/0126990 A1 | 5/2018 | Shimada et al. | |
| 2018/0208210 A1* | 7/2018 | Chapman | B62D 1/10 |
| 2019/0118852 A1* | 4/2019 | Suzuki | B60T 7/042 |
| 2019/0241205 A1* | 8/2019 | Toyama | B60N 3/005 |
| 2021/0078625 A1* | 3/2021 | Yamazaki | B60W 10/20 |

FOREIGN PATENT DOCUMENTS

| | | | | |
|---|---|---|---|---|
| CN | 107433972 A | 12/2017 | | |
| DE | 10259684 A1 * | 7/2004 | | B62D 1/18 |
| JP | 2008-162477 A | 7/2008 | | |
| JP | 2011-225128 A | 11/2011 | | |
| JP | 2017-030665 A | 2/2017 | | |
| JP | 2017-210027 A | 11/2017 | | |
| JP | 2018-075873 A | 5/2018 | | |

OTHER PUBLICATIONS

Office Action with search report dated Dec. 17, 2021 issued over the corresponding Chinese Patent Application No. 202010143651.1.
Office Action dated Mar. 1, 2022 issued over the corresponding Japanese Patent Application No. 2019-038171 with the English translation thereof.

* cited by examiner

VEHICLE STEERING APPARATUS

CROSS-REFERENCE TO RELATED APPLICATION

This application is based upon and claims the benefit of priority from Japanese Patent Application No. 2019-038171 filed on Mar. 4, 2019, the contents of which are incorporated herein by reference.

BACKGROUND OF THE INVENTION

Field of the Invention

The present invention relates to a vehicle steering apparatus that controls steering of the vehicle wheels using steer-by-wire.

Description of the Related Art

Japanese Laid-Open Patent Publication No. 2011-225128 discloses a vehicle steering system that makes it possible to raise the steering wheel from a manipulation position (a position where the driver can manipulate the steering wheel) in a state where the vehicle is stopped, to make it easy for the driver to enter and exit the vehicle.

SUMMARY OF THE INVENTION

Currently, automated driving vehicles are being developed in which the driving state of the vehicle can be switched from manual driving to automated driving or from automated driving to manual driving. When the automated driving vehicle performs automated driving, in order to improve the comfort of an occupant (driver sitting in the driver's seat), there is a desire to expand the space in front of the driver's seat. When the steering wheel is raised up in the system described in Japanese Laid-Open Patent Publication No. 2011-225128, the space in front of the driver is expanded. However, since the raised steering wheel blocks the region in front of the driver, forward visibility is worsened. This system is to be used when the vehicle is stopped, and cannot be used while the vehicle is travelling.

The present invention takes the above problems into consideration, and it is an objective of the present invention to provide a vehicle steering apparatus that can improve the comfort of the driver by expanding the space in front of the driver's seat, and also ensure forward visibility from the driver's seat.

An aspect of a present invention is a vehicle steering apparatus comprising a steering wheel that is mechanically separable from a steering mechanism of a vehicle; and a lateral movement mechanism that moves the steering wheel between a manipulation position in front of a driver's seat and a withdrawn position set to a position located between the manipulation position and a position in front of a passenger seat.

According to the present invention, it is possible to improve the comfort of the occupant (driver) sitting in the driver's seat. Furthermore, it is possible to ensure visibility in front of the driver's seat.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The following describes in detail preferred embodiments of a vehicle steering apparatus according to the present invention, while referencing the accompanying drawings.

[1. Outline of the Vehicle Steering Apparatus 100]

Figure 1:
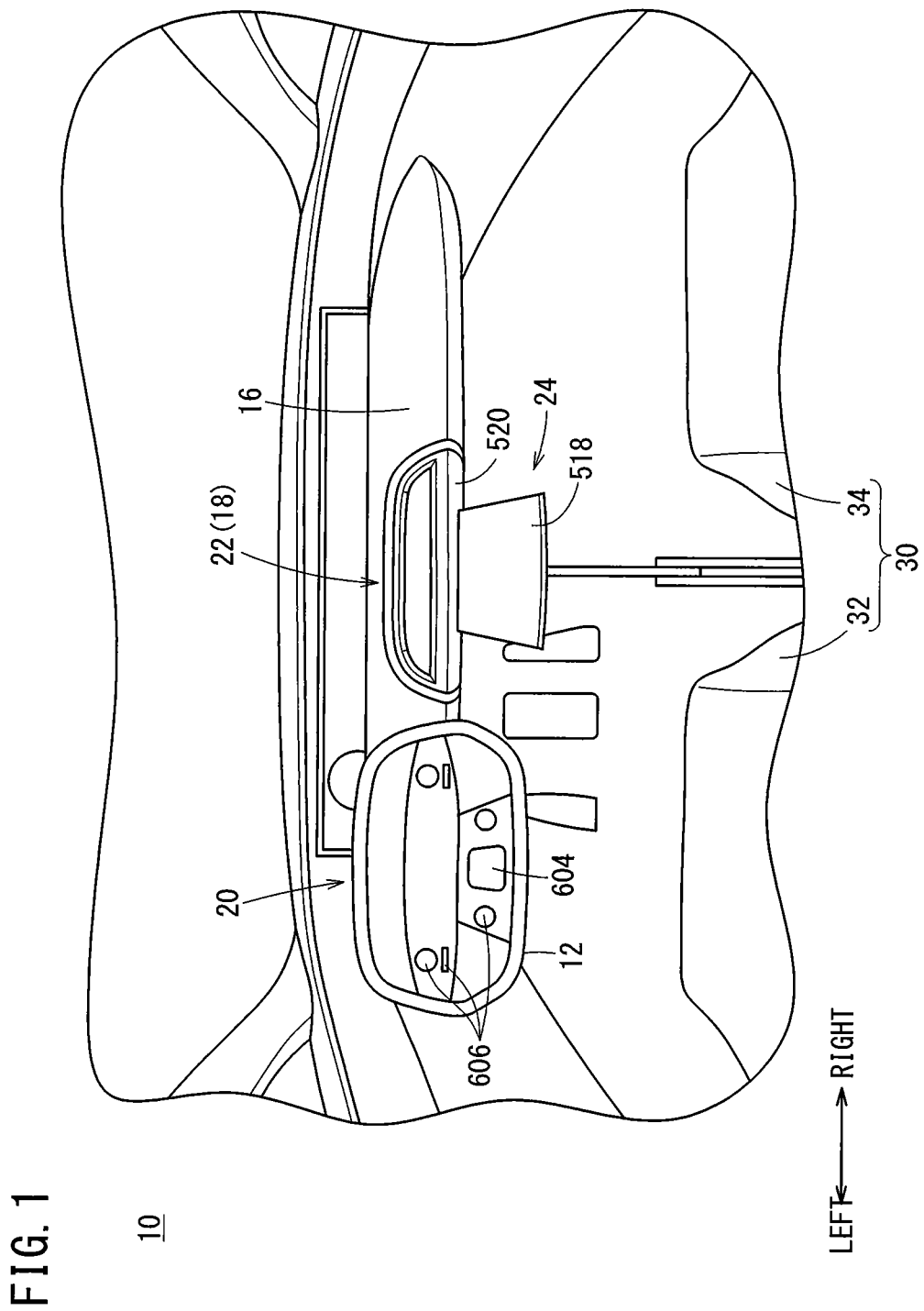
FIG. 1 is a schematic view of the view forward from the center of the vehicle compartment during manual driving.
Figure 2:
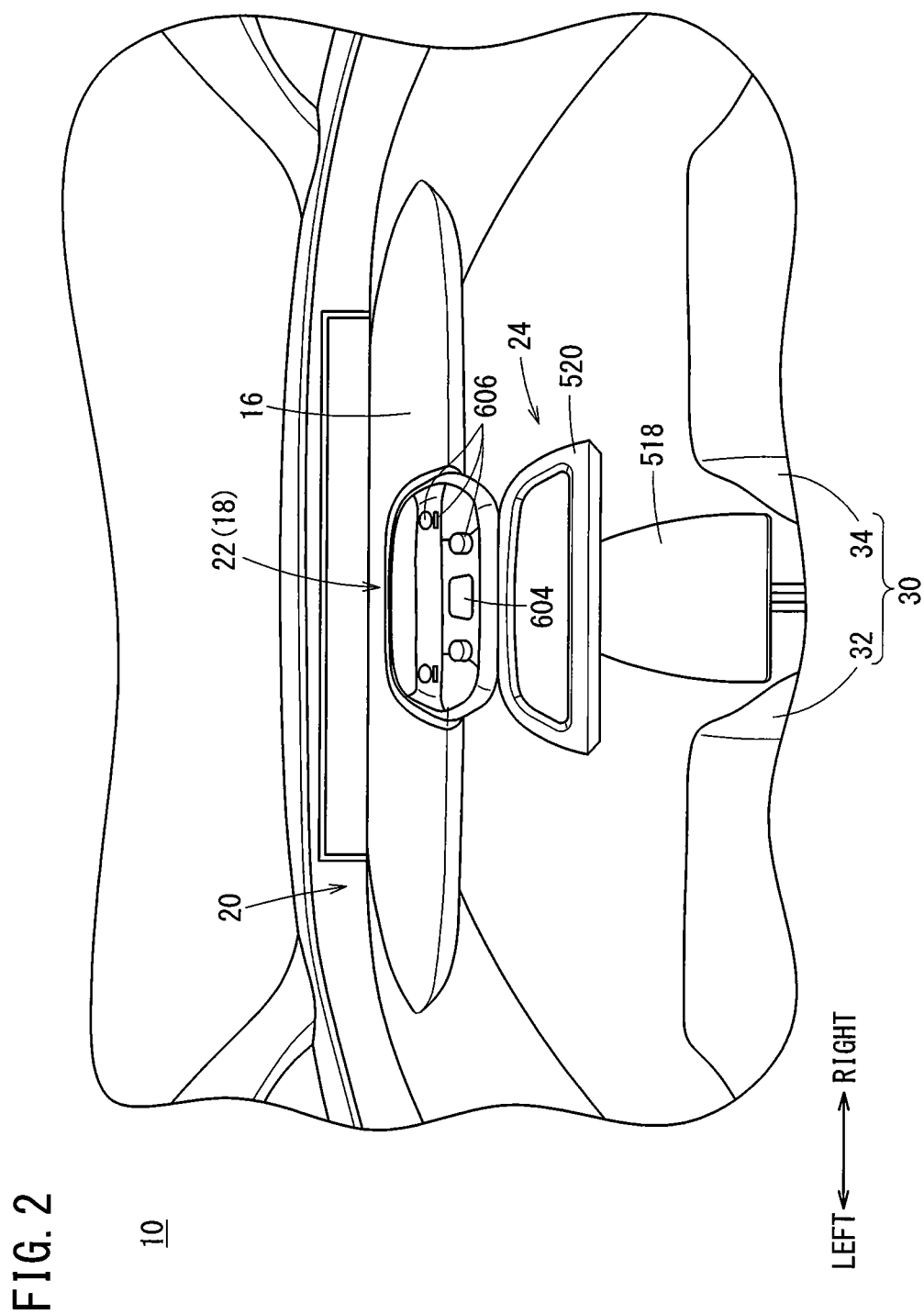
FIG. 2 is a schematic view of the view forward from the center of the vehicle compartment during automated driving.

The following describes the basics of a vehicle steering apparatus 100 (see FIG. 4), using FIGS. 1 and 2. In the following description, a vehicle steering apparatus 100 is envisioned that is provided in a vehicle 10 in which the driver seat 32 is on the left side. If the driver seat 32 were to be on the right side, the structure and operation of the vehicle steering apparatus 100 would swap left for right.

As shown in FIGS. 1 and 2, the vehicle steering apparatus 100 moves a steering wheel 12 between a manipulation position 20 in front of the driver seat 32 and a withdrawn position 22 set to a position located between the manipulation position 20 and a position in front of the passenger seat 34 (to the right in the progression direction). Furthermore, the vehicle steering apparatus 100 pushes the steering wheel 12 to the manipulation position 20 on the driver seat 32 side and pulls the steering wheel 12 to the withdrawn position 22 on the installment panel 16 side. The vehicle steering apparatus 100 causes the steering wheel 12 to stand upright and face the driver seat 32 at the manipulation position 20 on the driver seat 32 side, and also causes the steering wheel 12 to fold back away from the driver seat 32 at the withdrawn position 22.

[2. Manipulation Position 20 and Withdrawn Position 22]

Figure 3:
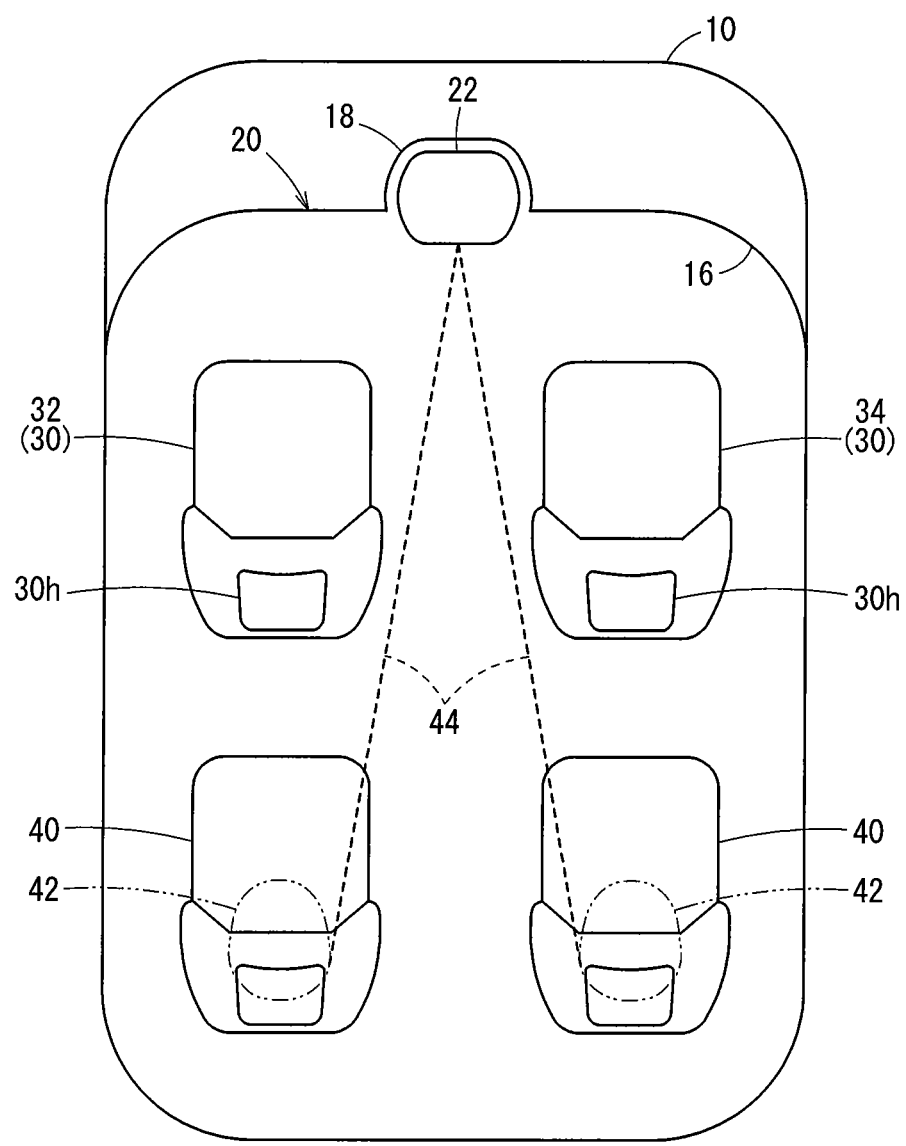
FIG. 3 is a schematic view of the vehicle compartment as seen from above.

The following describes the manipulation position 20 and the withdrawn position 22 using FIG. 3. In the present embodiment, the manipulation position 20 and the withdrawn position 22 are set to be near the installment panel 16. The manipulation position 20 is set to be in front of the driver seat 32.

The withdrawn position 22 is set to a position where all occupants of the vehicle 10 can see it. Usually, the occupant sitting in the driver seat 32 and an occupant sitting in the passenger seat 34 can see all of the installment panel 16. Therefore, the withdrawn position 22 is preferably set to be at a position where all occupants, especially those sitting in the back seats 40, can see the installment panel 16. The withdrawn position 22 is set in the following manner, for example.

The head position 42 of each occupant in the back seat 40 and the line of sight 44 from each head position 42 to the installment panel 16 are envisioned as shown in FIG. 3. A line of sight 44 that is unobstructed by any obstacles (the headrest 30h of the front seat 30) is extracted for each head position 42. The range in which the withdrawn position 22 can be set is within a range of the installment panel 16 in which the lines of sight 44 of all of the head positions 42 can connect to the installment panel 16. The withdrawn position 22 in the present embodiment is set to be a center position of the installment panel 16 in the width direction.

A recessed portion 18 of the installment panel 16 is formed in the withdrawn position 22. The recessed portion 18 is recessed toward the front of the vehicle 10. The shape of the recessed portion 18 enables the storage of the steering wheel 12 in a state where the steering wheel 12 is folded back from the driver seat 32 (toward the front of the vehicle 10). For example, the shape of the recessed portion 18 is complementary to the shape of the steering wheel 12, while being slightly larger than the steering wheel 12.

[3. Structure of the Vehicle Steering Apparatus 100]

Figure 4:
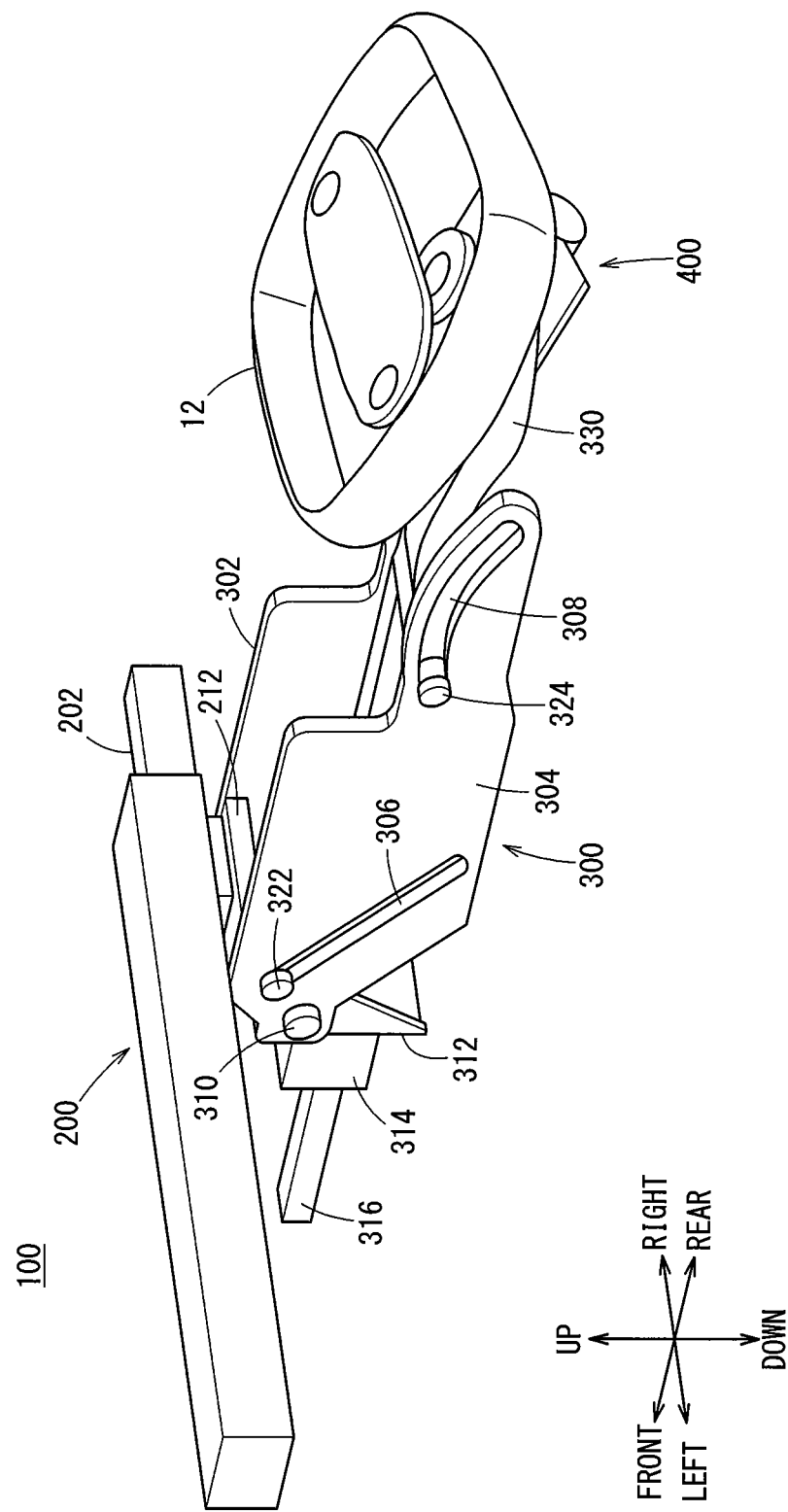
FIG. 4 is a perspective view of the vehicle steering apparatus.
Figure 11:
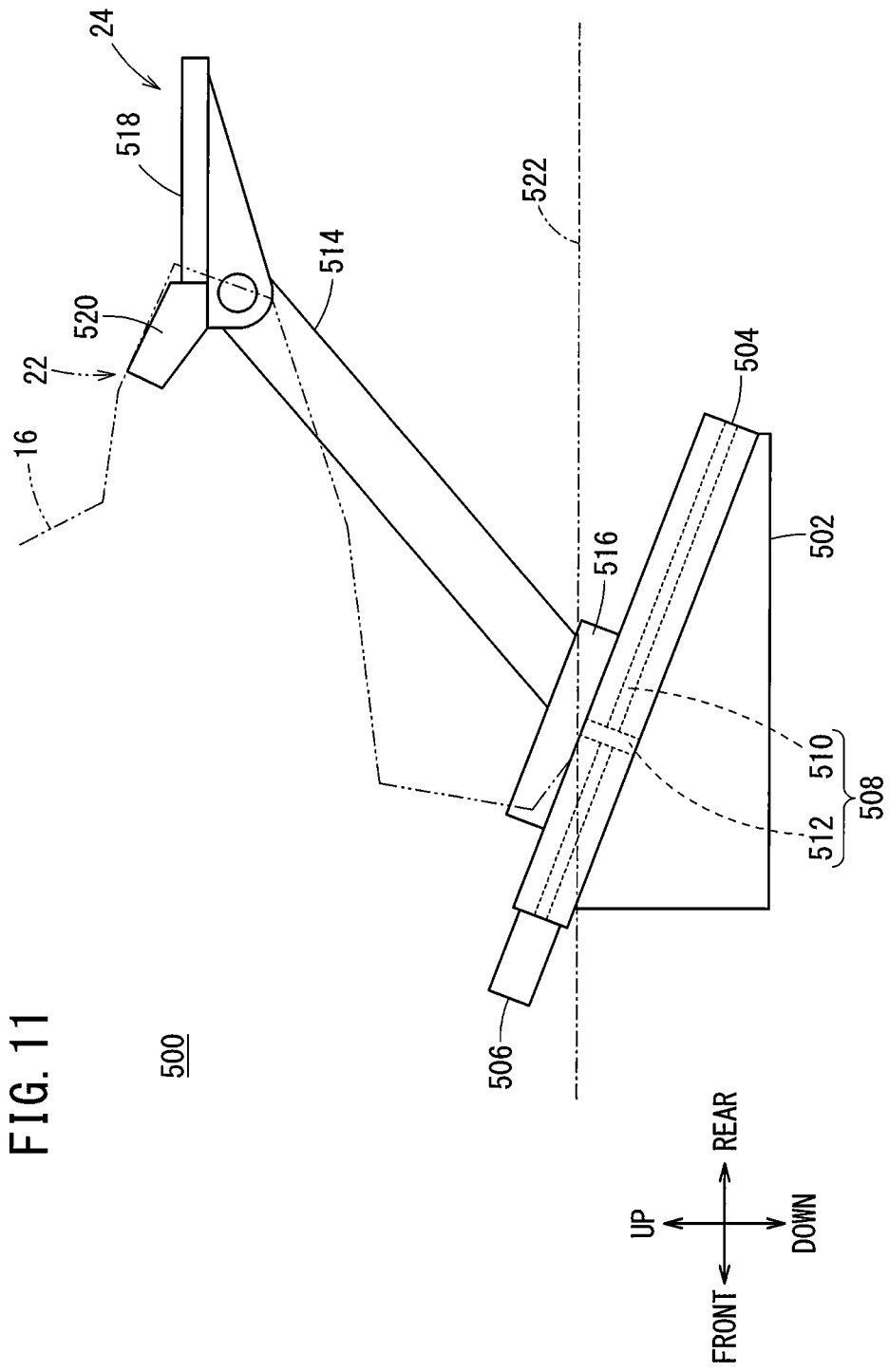
FIG. 11 is a schematic view of the tray moving mechanism during automated driving, as seen from the left.

As shown in FIG. 4, the vehicle steering apparatus 100 includes a lateral movement mechanism 200, a front-back movement mechanism 300, a foldable mechanism 400, and the steering wheel 12. Furthermore, the vehicle steering apparatus 100 includes a tray moving mechanism 500 that is shown in FIG. 11. Unless specifically mentioned in the following description, the front, rear, left, right, up, and down directions refer to directions using the vehicle steering apparatus 100 as a reference. The left-right direction is also the width direction. The directions using the vehicle steering apparatus 100 as a reference are identical to or substantially the same as the directions using the vehicle 10 as a reference.

[3.1. Lateral Movement Mechanism 200]

Figure 5:
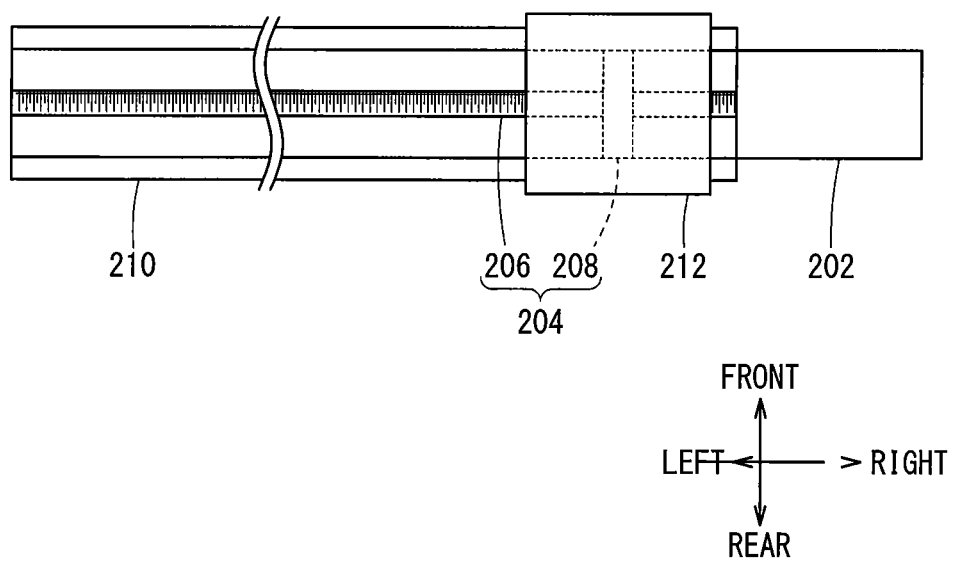
FIG. 5 is a schematic view of the lateral movement mechanism during automated driving, as seen from below.
Figure 6:
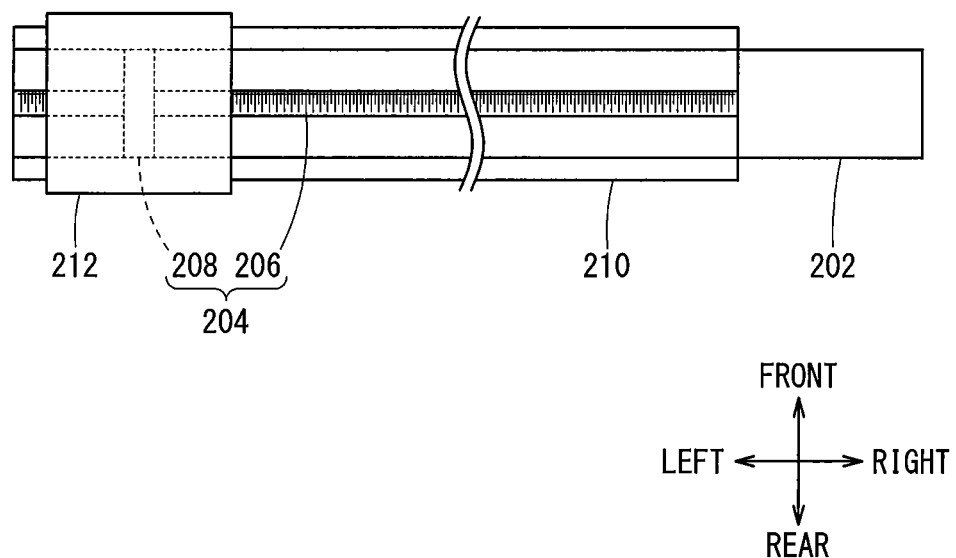
FIG. 6 is a schematic view of the lateral movement mechanism during manual driving, as seen from below.

As shown in FIGS. 5 and 6, the lateral movement mechanism 200 includes a first motor 202, a first ball screw 204, a first guide rail 210, and a first table 212. The lateral movement mechanism 200 is provided inside the installment panel 16.

The first motor 202 is arranged on the right side of the lateral movement mechanism 200. An output shaft of the first motor 202 is connected to a first screw shaft 206 of the first ball screw 204. The first screw shaft 206 is supported by a bearing in a manner to be rotatable centered on a linear axis parallel to the right-left direction. The first nut 208 of the first ball screw 204 is connected to the first table 212. The first guide rail 210 is parallel to the left-right direction, and limits the front-back movement range of the first table 212.

[3.2. Front-Back Movement Mechanism 300]

Figure 7:
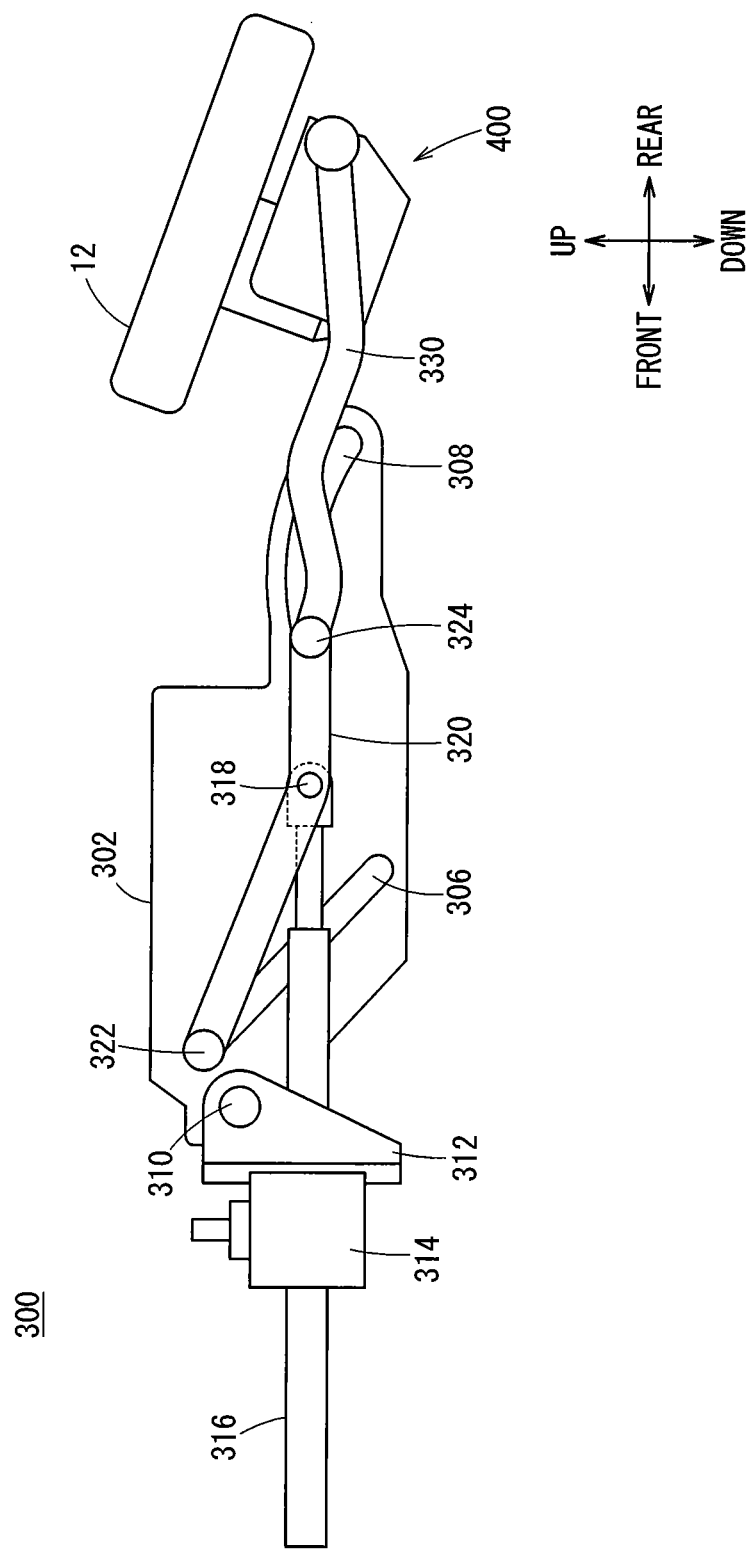
FIG. 7 is a schematic view of the front-back moving mechanism during automated driving, as seen from the left.
Figure 8:
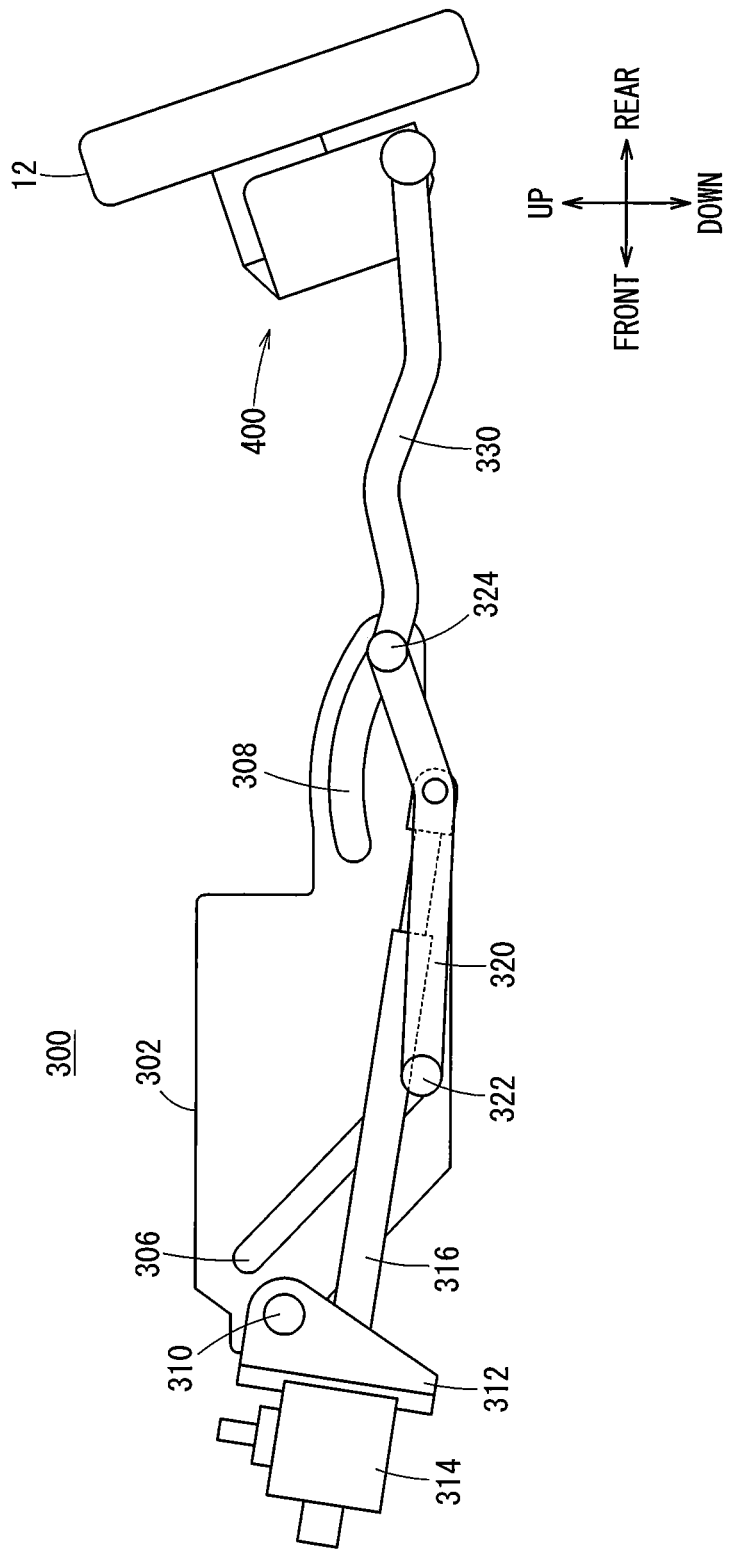
FIG. 8 is a schematic view of the front-back moving mechanism during manual driving, as seen from the left.

As shown in FIGS. 4, 7, and 8, the front-back movement mechanism 300 includes a right bracket 302 and left bracket 304 (see FIG. 4), as well as a motor bracket 312, a second motor 314, a rod 316, a first arm 320, and a second arm 330. In order to facilitate the description of the front-back movement mechanism 300, FIGS. 7 and 8 show the front-back movement mechanism 300 while omitting the left bracket 304. Furthermore, although not shown in the drawings, the direction toward the viewer in FIGS. 7 and 8 is the left side, and the direction away from the viewer is the right side.

The right bracket 302 and the left bracket 304 are shaped as boards, and have the same shape as each other. The right bracket 302 and the left bracket 304 are provided with a front hole 306 and a rear hole 308. The front hole 306 and the rear hole 308 are long holes for guiding the first arm 320 that moves in the front-back direction.

As shown in FIG. 4, the first table 212 is fixed between the top portion of the right bracket 302 and the top portion of the left bracket 304. A bracket support shaft 310, which is parallel to the left-right direction, is provided between the front portion of the right bracket 302 and the front portion of the left bracket 304. The motor bracket 312 is supported by the bracket support shaft 310, in a manner to be pivotable centered on an axial line parallel to the left-right direction.

The second motor 314 is attached to a front surface of the motor bracket 312. The rod 316 is provided extending in the front-back direction, through a hole (not shown in the drawings) formed in the motor bracket 312. An output shaft of the second motor 314 includes a pinion (not shown) and the rod 316 includes a rack (not shown) along the longitudinal direction.

The first arm 320 is a member that is connected to the left and right arms. The first arm 320 is arranged between the right bracket 302 and the left bracket 304, and is supported by an arm support shaft 318 provided at a rear end of the rod 316 in a manner to be pivotable centered on an axial line parallel to the left-right direction. The first arm 320 is movable along the left surface of the right bracket 302 and the right surface of the left bracket 304. The left-side front end of the first arm 320 interlocks with a front protrusion 322 inserted into the front hole 306 from the left side of the left bracket 304. The left-side rear end of the first arm 320 interlocks with a rear protrusion 324 inserted into the rear hole 308 from the left side of the left bracket 304. The structure of the first arm 320 on the right side is the same as on the left.

The second arm 330 is supported by the rear protrusion 324, which interlocks with the left and right rear end of the first arm 320, in a manner to be pivotable centered on an axial line parallel to the left-right direction. The front end of the second arm 330 is arranged inside the left and right arms forming the first arms 320.

[3.3. Foldable Mechanism 400]

Figure 9:
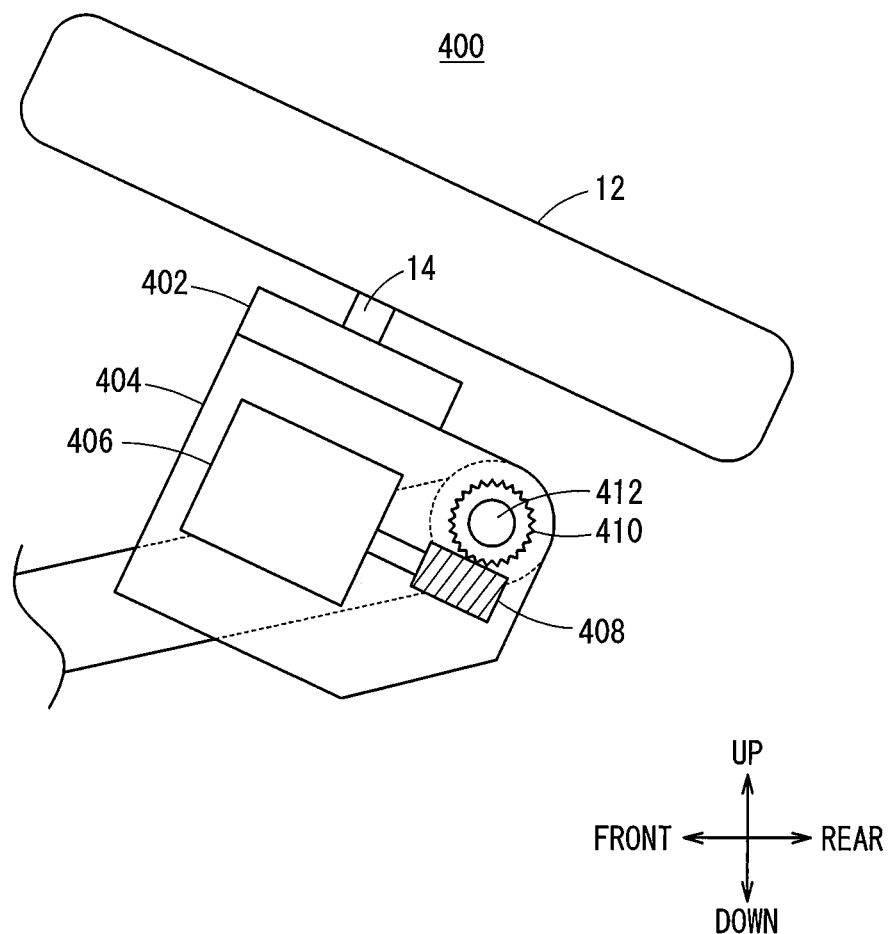
FIG. 9 is a schematic view of the foldable mechanism during automated driving, as seen from the left.
Figure 10:
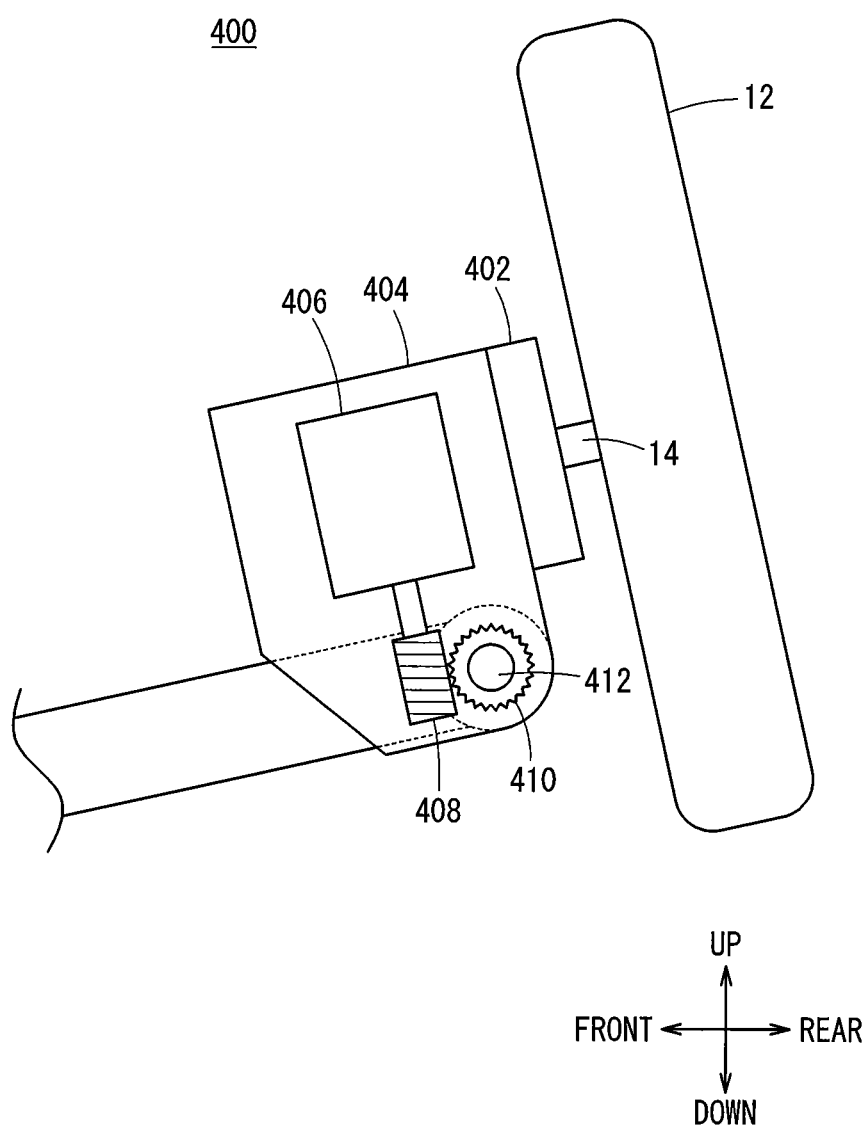
FIG. 10 is a schematic view of the foldable mechanism during manual driving, as seen from the left.

As shown in FIGS. 9 and 10, the foldable mechanism 400 includes a shaft support portion 402, a column cover 404, a third motor 406, a worm 408, and a worm wheel 410. The foldable mechanism 400 corresponds to a steering column. Furthermore, although not shown in the drawings, the direction toward the viewer in FIGS. 9 and 10 is the left side, and the direction away from the viewer is the right side.

The shaft support portion 402 supports the steering shaft 14, which is connected to the steering wheel 12, in a rotatable manner. The shaft support portion 402 is attached to the column cover 404. The column cover 404 houses the third motor 406, the worm 408, and the worm wheel 410. The column cover 404 pivots centered on an axial line parallel to the left-right direction, along with a cover support shaft 412. The third motor 406 is fixed to the column cover 404. The output shaft of the third motor 406 is connected to the worm 408. The worm 408 engages with the worm wheel 410. The cover support shaft 412 is connected to or penetrates through the center of the worm wheel 410, and the worm wheel 410 is fixed to the cover support shaft 412.

[3.4. Tray Moving Mechanism 500]

Figure 12:
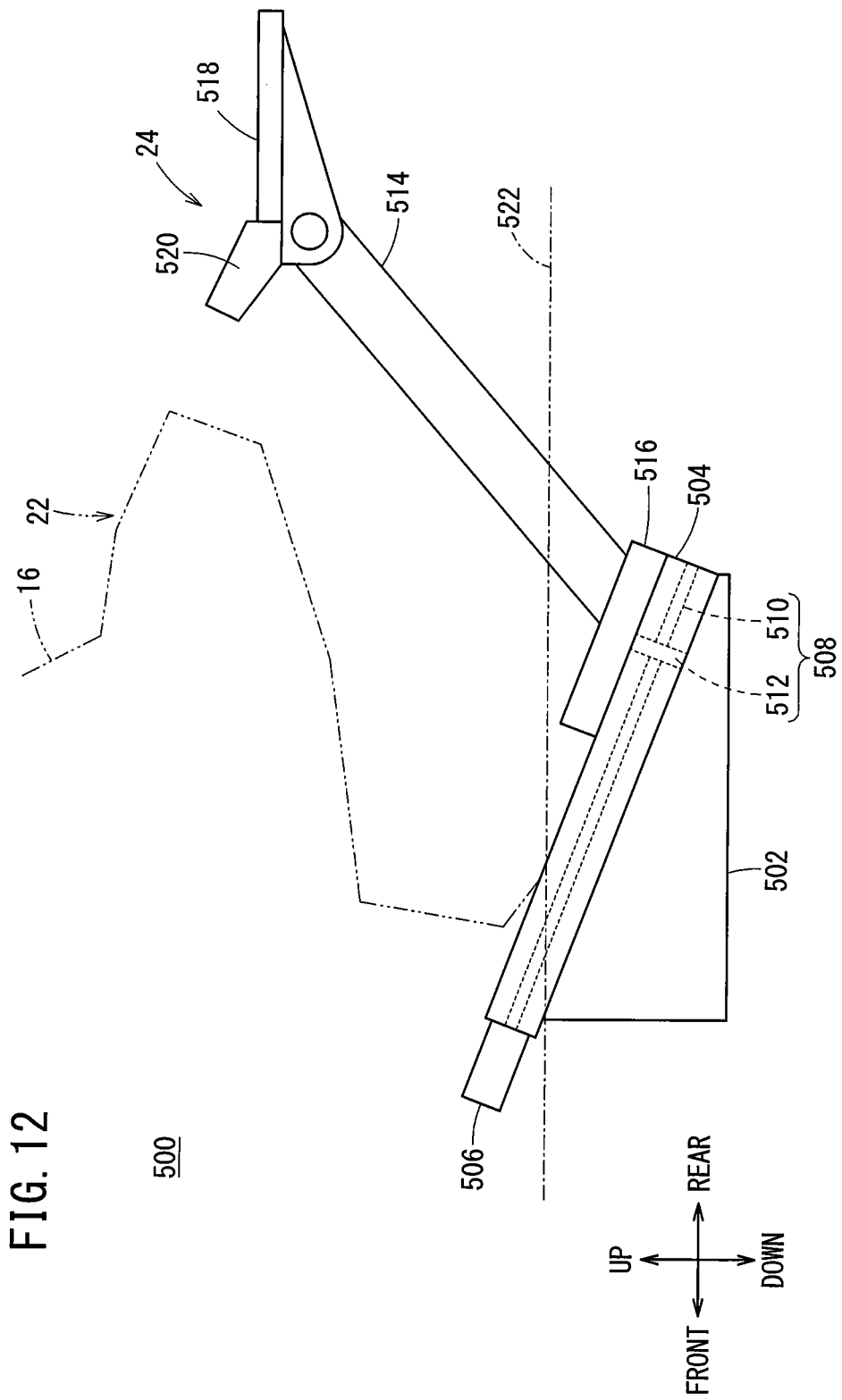
FIG. 12 is a schematic view of the tray moving mechanism during manual driving, as seen from the left.

As shown in FIGS. 11 and 12, the tray moving mechanism 500 includes a base platform 502, a second guide rail 504, a fourth motor 506, a second ball screw 508, a leg portion 514, a second table 516, an in-room table 518, and a tray 520.

The base platform 502 is arranged below a floor panel 522, and is attached to the vehicle body. The second guide rail 504 is supported by the base platform 502, while being inclined such that the front thereof is higher than the rear thereof. The fourth motor 506 is arranged at the front end of the second guide rail 504. The output shaft of the fourth motor 506 is connected to a second screw shaft 510 of the second ball screw 508. The second screw shaft 510 is provided along the second guide rail 504, and is supported in a rotatable manner by a bearing. A second nut 512 of the second ball screw 508 is connected to the second table 516. The leg portion 514 is inclined such that the rear end is higher than the front end. The bottom end of the leg portion 514 is fixed to the second table 516, and the top end of the leg portion 514 is fixed to the in-room table 518.

The tray 520 is attached to the front portion of the in-room table 518. The tray 520 opens upward in the vehicle compartment. The tray 520 is a storage member accessible from the vehicle compartment to take objects in and out the tray 520.

[4. Configuration of a Control System of the Vehicle Steering Apparatus 100]

Figure 13:
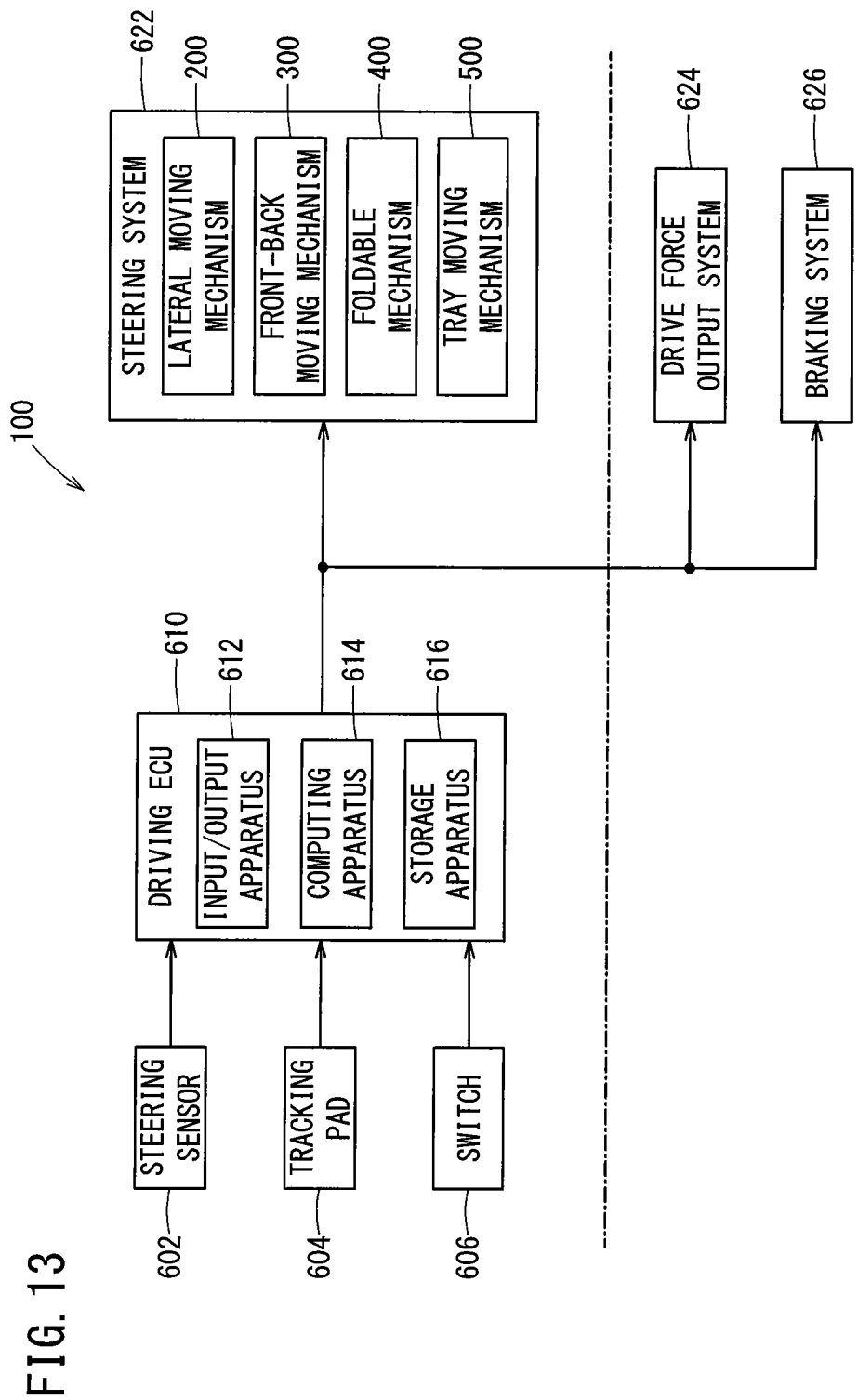
FIG. 13 is a schematic view of a control system of the vehicle steering apparatus.

The following describes the configuration of a control system of the vehicle steering apparatus 100, using FIG. 13. In the following description, the vehicle 10 is envisioned as an automated driving vehicle that can switch between manual driving and automated driving. The vehicle 10 may be an automated driving vehicle (driving assistance vehicle) that can switch only the steering between manual and automated modes. A steer-by-wire system, in which the steering wheel 12 and the steering mechanism are mechanically separated, can be used in the vehicle 10.

The vehicle steering apparatus 100 includes a steering angle sensor 602, a tracking pad 604, various switches 606, a driving ECU 610, and a steering system 622.

The steering angle sensor 602 is a rotational angle sensor that detects the rotational angle of the steering shaft 14. The steering angle sensor 602 is provided near the steering shaft 14, e.g. on the shaft support portion 402 or the column cover 404. The tracking pad 604 is a capacitive or pressure-sensitive touch sensor that detects a touch operation performed by an occupant. The tracking pad 604 is provided inside a rim of the steering wheel 12. The various switches 606 include manipulation switches for the vehicle 10, e.g. manipulation switches for a display, a car navigation device, an audio/visual device, or the like (not shown in the drawings). The switches 606 are provided inside the rim of the steering wheel 12, the installment panel 16, the tray 520, and the like. The steering angle sensor 602, the tracking pad 604, and the switch 606 output detection signals to the driving ECU 610.

The driving ECU 610 includes an input/output apparatus 612, a computing apparatus 614, and a storage apparatus 616. The input/output apparatus 612 is formed by an A/D conversion circuit, a communication interface, a device driver, and the like. The computing apparatus 614 is formed by a processor including a CPU and the like, for example. The computing apparatus 614 realizes various functions by executing programs stored in the storage apparatus 616. The storage apparatus 616 is formed by a RAM, a ROM, and the like. The storage apparatus 616 stores various programs and various pieces of information used in the processes performed by the computing apparatus 614.

When a prescribed condition is met or a switch signal output from the driving mode switch (not shown in the drawings) is received, the computing apparatus 614 switches the driving state of the vehicle 10 from the manual driving state to the automated driving state or from the automated driving state to the manual driving state. During manual driving, the computing apparatus 614 outputs a control signal corresponding to a manipulation of the steering wheel 12 to an ECU (not shown in the drawings) of the steering system 622, and outputs a control signal corresponding to the manipulation of the acceleration pedal or brake pedal to ECUs (not shown in the drawings) of a brake system 626 and a drive force output system 624. During automated driving, the computing apparatus 614 calculates an optimal travel path and vehicle velocity, based on various pieces of information input by various sensors (not shown in the drawings). The computing apparatus 614 outputs a control signal for realizing the travel path to the ECU (not shown in the drawings) of the steering system 622, and outputs a control signal for realizing the vehicle velocity to the ECUs (not shown in the drawings) of the drive force output system 624 and the brake system 626.

The steering system 622 includes the lateral movement mechanism 200, the front-back movement mechanism 300, the foldable mechanism 400, and the tray moving mechanism 500. The motor of each mechanism is driven by receiving power supplied from the driving ECU 610.

[5. Operation of the Vehicle Steering Apparatus 100]

When the driving state of the vehicle 10 is manual driving, as shown in FIG. 1, the steering wheel 12 is arranged at the manipulation position 20, and the tray 520 is arranged at the withdrawn position 22. In this state, as shown in FIG. 6, the first nut 208 and the first table 212 of the lateral movement mechanism 200 are positioned as far as possible to the left in their movement range. Therefore, the front-back movement mechanism 300 is positioned as far as possible to the left in its movement range. Furthermore, as shown in FIG. 8, the rod 316, the first arm 320, and the second arm 330 of the front-back movement mechanism 300 are positioned as far to the rear as possible in their movement range. Therefore, the foldable mechanism 400 is positioned as far as possible to the rear in its movement range. Furthermore, as shown in FIG. 10, the foldable mechanism 400 and the steering wheel 12 are raised up. Yet further, as shown in FIG. 11, the second nut 512, the second table 516, the leg portion 514, the in-room table 518, and the tray 520 of the tray moving mechanism 500 are positioned as far as possible to the front and top of their movement range.

In the present embodiment, when the driving state of the vehicle 10 is switched from the manual driving state (see FIG. 1) to the automated driving state (see FIG. 2), the computing apparatus 614 of the driving ECU 610 changes the position and orientation of the steering wheel 12. The following describes this operation.

The computing apparatus 614 controls the device driver of the input/output apparatus 612 to start the supply of power to the first motor 202 of the lateral movement mechanism 200. When this happens, the first motor 202 rotates in one direction, and the first nut 208, the first table 212, and the front-back movement mechanism 300 move to the right from the position shown in FIG. 6. As shown in FIG. 5, when the first nut 208, the first table 212, and the front-back movement mechanism 300 move to a position farthest right in their movement range, the computing apparatus 614 controls the device driver of the input/output apparatus 612 to stop the supply of power to the first motor 202.

The computing apparatus 614 controls the device driver of the input/output apparatus 612 to start the supply of power to the second motor 314 of the front-back movement mechanism 300. When this happens, the second motor 314 rotates in one direction, and the rod 316, the first arm 320, the second arm 330, and the foldable mechanism 400 move forward from the position shown in FIG. 8. As shown in FIG. 7, when the rod 316, the first arm 320, the second arm 330, and the foldable mechanism 400 move farthest forward in their movement range, the computing apparatus 614 controls the device driver of the input/output apparatus 612 to stop the supply of power to the second motor 314.

The computing apparatus 614 controls the device driver of the input/output apparatus 612 to start the supply of power to the third motor 406 of the foldable mechanism 400. When this happens, the third motor 406 rotates in one direction, and the foldable mechanism 400 and the steering wheel 12 fold forward from the position shown in FIG. 10. As shown in FIG. 9, when the foldable mechanism 400 and the steering wheel 12 are fully folded, the computing apparatus 614 controls the device driver of the input/output apparatus 612 to stop the supply of power to the third motor 406.

The computing apparatus 614 controls the device driver of the input/output apparatus 612 to start the supply of power to the fourth motor 506 of the tray moving mechanism 500. When this happens, the fourth motor 506 rotates in one direction, and the second nut 512, the second table 516, the leg portion 514, the in-room table 518, and the tray 520 move backward and downward from the position shown in FIG. 11. As shown in FIG. 12, when the second nut 512, the second table 516, the leg portion 514, the in-room table 518, and the tray 520 move to the farthest backward and downward position of their movement range, the computing apparatus 614 controls the device driver of the input/output apparatus 612 to stop the supply of power to the fourth motor 506.

The computing apparatus 614 causes the motors of the lateral movement mechanism 200, the front-back movement mechanism 300, the foldable mechanism 400, and the tray moving mechanism 500 to operate in a predetermined order and at predetermined timings. It should be noted that the computing apparatus 614 causes the steering wheel 12 to move to the withdrawn position 22 after moving the tray 520 from the withdrawn position 22, such that the steering wheel 12 and the tray 520 do not contact each other. The steering wheel 12 is exposed inside the vehicle compartment when arranged at the withdrawn position 22.

As described above, when the driving state of the vehicle 10 is switched from the manual driving state (see FIG. 1) to the automated driving state (see FIG. 2), the computing apparatus 614 moves the steering wheel 12 from the manipulation position 20 to the withdrawn position 22, and then folds the steering wheel 12 forward. Furthermore, the computing apparatus 614 moves the tray 520 from the withdrawn position 22 to an intermediate position 24 between the front seats 30. The intermediate position 24 is positioned rearward of the withdrawn position 22 in the vehicle 10.

When the driving state of the vehicle 10 is switched from the automated driving state (see FIG. 2) to the manual driving state (see FIG. 1), the computing apparatus 614 changes the position and the orientation of the steering wheel 12. Each mechanism moves each member in a direction opposite the direction that the members were moved in when switching from the manual driving state (see FIG. 1) to the manual driving state (see FIG. 2).

Even when the driving state of the vehicle 10 is the manual driving state, the computing apparatus 614 prioritizes the manipulations of the occupants. The steering wheel 12 housed in the recessed portion 18 cannot be steered. In the present embodiment, even in the automated driving mode, the occupants can indicate their intent to steer or accelerate to the computing apparatus 614 by manipulating the tracking pad 604. For example, when an occupant makes a vertical sliding manipulation on the tracking pad 604 in a state where it is possible to change lanes, the computing apparatus 614 detects the intent of the occupant and steers the vehicle 10 in accordance with this intent. Furthermore, when an occupant makes a vertical sliding manipulation on the tracking pad 604, the computing apparatus 614 detects the intent of the occupant and accelerates the vehicle 10 in accordance with this intent.

[6. Modifications]

In the embodiment described above, the withdrawn position 22 of the steering wheel 12 is in the center of the vehicle 10 in the width direction. However, the withdrawn position 22 may be at a position other than the center of the vehicle 10 in the width direction. Furthermore, the withdrawn position 22 may be set to a position where some of the occupants cannot see the steering wheel 12. For example, the withdrawn position 22 may be set to a position other than the center between a position in front of the driver seat 32 and a position in front of the passenger seat 34. In this case, the length of the first screw shaft 206 of the lateral movement mechanism 200 and the length of the first guide rail 210 are set according to the distance between the manipulation position 20 and the withdrawn position 22.

In the embodiment described above, the computing apparatus 614 of the driving ECU 610 controls the motor of each mechanism to change the lateral position, the front-back position, and the inclination angle of the steering wheel 12. Instead, at least one of the lateral position, the front-back position, and the inclination angle of the steering wheel 12 may be changed manually.

[7. Technical Concepts Gained from the Embodiments]

The following describes the technical concepts that can be understood from the embodiments and modifications described above.

An aspect of the present invention comprises:

a steering wheel 12 that is mechanically separated from a steering mechanism of a vehicle 10; and a lateral movement mechanism 200 that moves the steering wheel 12 between a manipulation position 20 set in front of a driver seat 32 and a withdrawn position 22 set to a position located between the manipulation position 20 and a position in front of a passenger seat 34.

According to the above configuration, the steering wheel 12 can be moved from the manipulation position 20 to the withdrawn position 22 that is set to the position located between the manipulation position 20 and the position in front of the passenger seat 34, and therefore it is possible to expand the space in front of the driver seat 32 and to improve the comfort of an occupant (driver) sitting in the driver seat 32. Furthermore, the steering wheel 12 arranged at the withdrawn position 22 does not obstruct the region in front of the driver seat 32, and therefore the visibility in front of the driver seat 32 can be ensured.

In an aspect of the present invention, a head position 42 of each occupant may be set with respect to each back seat 40 of the vehicle 10, and the withdrawn position 22 may be set as a position where each line of sight 44, from the steering wheel 12 to each head position 42, is not obstructed by an obstacle (headrest 30h).

According to the above configuration, each occupant can easily see the steering wheel 12 arranged at the withdrawn position 22.

In an aspect of the present invention, the withdrawn position 22 may be arranged at a position at the center of the vehicle 10 in a width direction.

According to the above configuration, each occupant can easily see the steering wheel 12 arranged at the withdrawn position 22, and the comfort of the occupant sitting in the driver seat 32 and the occupant sitting in the passenger seat 34 can be improved.

In an aspect of the present invention, the steering wheel 12 may be exposed inside a vehicle compartment at the withdrawn position 22.

According to the above configuration, each occupant can easily see the steering wheel 12 arranged at the withdrawn position 22.

An aspect of the present invention comprises a movement control unit (driving ECU 610) that controls an operation of the lateral movement mechanism 200, wherein the vehicle 10 can switch between manual steering and automated steering, and when switching from manual steering to automated steering, the movement control unit (driving ECU 610) may move the steering wheel 12 from the manipulation position 20 to the withdrawn position 22.

According to the above configuration, when the driving state of the vehicle 10 is the automated driving state, the space in front of the driver seat 32 is expanded and the comfort of the occupant sitting in the driver seat 32 is improved. Furthermore, each occupant can easily see the steering wheel 12 arranged at the withdrawn position 22.

In an aspect of the present invention, the steering wheel 12 may include an instructing unit that outputs a vehicle manipulation signal corresponding to an input manipulation performed by an occupant.

In an aspect of the present invention, the instructing unit may be a tracking pad 604.

According to the above configuration, an occupant can perform the steering manipulation by using the tracking pad 604, instead of the steering wheel 12 arranged at the withdrawn position 22.

In an aspect of the present invention, a recessed portion 18 that is recessed toward the front of the vehicle 10 may be formed in an installment panel 16 at the withdrawn position 22.

According to the above configuration, the steering wheel 12 arranged at the withdrawn position 22 is housed in the recessed portion 18 of the installment panel 16, and therefore the steering wheel 12 does not occupy the space between the driver seat 32 and the passenger seat 34. Furthermore, the aesthetics of the vehicle compartment are improved.

In an aspect of the present invention, the vehicle steering apparatus may include another member that is housed in the recessed portion 18 when the steering wheel 12 is positioned at the manipulation position 20 and that is positioned outside the recessed portion 18 when the steering wheel 12 is housed in the recessed portion 18 at the withdrawn position 22.

According to the above configuration, the recessed portion 18 can be effectively utilized.

In an aspect of the present invention, the other member may be a housing member (tray 520) enabling objects to be put in and out from inside the vehicle compartment.

In an aspect of the present invention, when the steering wheel 12 is housed in the recessed portion 18 at the withdrawn position 22, the housing member (tray 520) may be positioned farther rearward in the vehicle 10 than the steering wheel 12.

According to the above configuration, the housing member (tray 520) can be used by both the occupant sitting in the driver seat 32 and the occupant sitting in the passenger seat 34.

The vehicle steering apparatus according to the present invention is not limited to the embodiments described above, and various alterations and improvements can be added to the above-described embodiments without deviating from the scope of the present invention.

What is claimed is:

1. A vehicle steering apparatus comprising a steer-by-wire system, the vehicle steering apparatus further comprising:
a steering wheel that is mechanically separable from a steering mechanism of a vehicle; and
a lateral movement mechanism that moves the steering wheel between a manipulation position in front of a driver's seat and a withdrawn position set to a position between the manipulation position and a position in front of a passenger seat, wherein
a recessed portion that is recessed toward the front of the vehicle is formed in an installment panel at the withdrawn position,
the vehicle steering apparatus includes another member that is housed in the recessed portion when the steering wheel is positioned at the manipulation position and that is positioned outside the recessed portion when the steering wheel is housed in the recessed portion at the withdrawn position,
the other member is a housing member enabling objects to be put in an out from inside a vehicle compartment, and
when the steering wheel is housed in the recessed portion at the withdrawn position, the housing member is positioned rearward of the steering wheel in the vehicle.

2. The vehicle steering apparatus according to claim 1, wherein
a head position of each occupant is set in a back seat of the vehicle, and
the withdrawn position is set as a position where each line of sight, from the steering wheel to each head position, is not obstructed by an obstacle.

3. The vehicle steering apparatus according to claim 1, wherein
the withdrawn position is set at a position at a center of the vehicle in a width direction.

4. The vehicle steering apparatus according to claim 1, wherein
the steering wheel is exposed inside the vehicle compartment at the withdrawn position.

5. The vehicle steering apparatus according to claim 1, comprising:
a movement control unit configured to control an operation of the lateral movement mechanism, wherein
the vehicle can switch between manual steering and automated steering, and
when switching from manual steering to automated steering, the movement control unit moves the steering wheel from the manipulation position to the withdrawn position.

6. The vehicle steering apparatus according to claim 1, wherein the steering wheel includes an instructing unit configured to output a vehicle manipulation signal corresponding to an input manipulation performed by an occupant.

7. The vehicle steering apparatus according to claim 6, wherein
the instructing unit is a tracking pad.

8. A vehicle steering apparatus comprising a steer-by-wire system, the vehicle steering apparatus further comprising:
a steering wheel that is mechanically separable from a steering mechanism of a vehicle; and
a lateral movement mechanism that moves the steering wheel between a manipulation position in front of a driver's seat and a withdrawn position set to a position between the manipulation position and a position in front of a passenger seat;
a front-back movement mechanism that moves the steering wheel in a front-back direction; and
a movement control unit configured to control an operation of the lateral movement mechanism and the front-back movement mechanism, wherein
the lateral movement mechanism comprises a guide rail parallel to a left-right direction, and
the steering wheel is movable in the left-right direction along the guide rail,
the vehicle can switch between manual steering and automated steering, and
when switching from manual steering to automated steering, the movement control unit moves the steering wheel from the manipulation position to the withdrawn position and moves the steering wheel forward.

* * * * *